United States Patent [19]
Tornqvist et al.

[11] 3,972,862
[45] Aug. 3, 1976

[54] STEREOREGULATED COPOLYMERS OF BUTADIENE AND PIPERYLENE

[76] Inventors: Erik G. M. Tornqvist, 38 Mareu Drive, Scotch Plains, N.J. 07076; Albert M. Gessler, 448 Orchard St., Cranford, N.J. 07016

[22] Filed: July 22, 1974

[21] Appl. No.: 490,284

[52] U.S. Cl............................ 526/337; 260/429.5; 252/429 C; 526/159; 526/237
[51] Int. Cl.²....................... C08F 4/64; C08F 4/66; C08F 236/20
[58] Field of Search.......................... 260/82.1, 94.3

[56] References Cited
UNITED STATES PATENTS

| | | | |
|---|---|---|---|
| 3,642,758 | 2/1972 | Cozewith et al. | 260/94.3 |
| 3,663,450 | 5/1972 | Cozewith et al. | 260/94.3 X |
| 3,779,944 | 12/1973 | Cozewith et al. | 260/94.3 X |

*Primary Examiner*—William F. Hamrock
*Attorney, Agent, or Firm*—C. A. Cohen; J. J. Mahon

[57] ABSTRACT

Elastomeric copolymers of butadiene and piperylene containing at least 50 mole percent butadiene and having a random distribution of monomer units enchained in a stereo-regulated manner are characterized by, (1) vinyl unsaturation pendant to the main polymer chain which is equal to or less than 10 percent of the total unsaturation present in the polymer; (2) enchainment of at least 95 percent of the piperylene as the 1,2-trans and 1,4-trans-stereoisomers; and (3) selective enchainment of between 50 and 95 percent of the butadiene as the 1,4-trans-stereoisomer. The copolymers, which are prepared from a mixture of the monomers with the aid of an iodine-containing hydrocarbon-soluble catalyst system comprising $TiX_n$-$xMI_n$-$yI_2$-$zAlR_3$-QLB, can be compounded with other elastomers and with process oils, resins, plasticizers and reinforcing agents such as carbon black, silica, talc and the like. When vulcanized, the copolymers exhibit a high tensile strength, extension, modulus and abrasion resistance. They are particularly useful in automotive tire-tread compositions.

6 Claims, No Drawings

STEREOREGULATED COPOLYMERS OF BUTADIENE AND PIPERYLENE

BACKGROUND OF THE INVENTION

1. Field of the Invention

This invention relates to elastomeric copolymers of 1,3-butadiene and 1,3-pentadiene (piperylene) in which the monomers comprising the copolymer are randomly distributed in the polymer chain in a stereoregulated manner. More particularly, this invention relates to copolymers of said monomers prepared with the aid of an iodine-containing catalyst system comprised of a titanium halide, a metal iodide from Groups IIIa or IVa of the Periodic Table of the Elements an aluminum alkyl, elemental iodine, and a Lewis Base. The vulcanized polymers possess a high abrasion resistance and are particularly useful in automotive tire-tread compositions.

2. Prior Art

The preparation of crystalline copolymers of butadiene and piperylene was first reported by G. Natta et al in Makromol. Chem. 53, 52 (1962). Two types of copolymer were disclosed. In the one, prepared with a heterogeneous catalyst system consisting of $Al(Et)_3$-$VCl_3$, both monomers were exclusively enchained in a 1,4-trans-configuration. In the other, using a homogeneous catalyst system consisting of $Al(Et)_2Cl$ and vanadium tris-acetylacetonate, all of the butadiene was enchained as the 1,4-trans-stereoisomer while the piperylene monomer units were either enchained as the 1,2- or 1,4-trans-stereoisomers.

In a subsequent publication in Makromol. Chem. 61, 90 (1963), L. Porri et al, described the preparation of copolymers of butadiene and piperylene with homogeneous catalyst systems consisting of (1) $Al(Et)_2Cl$-$V(AcAc)_3$ and (2) $Al(Et)_2Cl$-$VCl_3$.3THF in which (AcAc) is an acetylacetonyl ion and THF is tetrahydrofuran. The products from both catalyst systems were identical and were characterized by the absence of any pendant vinyl unsaturation; 100 percent enchainment of the butadiene as the 1,4-trans-isomer; 100 percent enchainment of the piperylene as either the 1,2 or 1,4-trans-isomer and the complete absence of any cis-isomers in the polymers.

A. Carbonaro et al in an article in Rubber Chem. & Tech. 46, 1274 (1973) have described the synthesis and vulcanizate properties of a series of butadiene-piperylene copolymers prepared with a catalyst system consisting of a mixture of $Al(Et)_2Cl$ with $AlEtCl_2$ and $V(AcAc)_3$. The stereoisomeric configuration of the butadiene and piperylene in the copolymers was essentially the same as in the copolymers prepared by Porri et al with similar homogeneous catalyst systems having the same components.

Similar copolymers of butadiene and piperylene prepared with a catalyst system consisting of ethyl aluminum sesquichloride ($Et_3Al_2Cl_3$) and $V(AcAc)_3$ in which the butadiene was exclusively enchained as the 1,4-trans-stereoisomer have been reported by H. Weber et al in Makromol. Chem. 101, 320 (1967).

U.S. Pat. No. 3,642,758 discloses a catalyst system comprising $TiX_3 \cdot nAlI_3$-$xAlR_3$ and a Lewis Base, useful for the stereospecific polymerization of butadiene. Related catalyst systems have been disclosed in U.S. Pat. No. 3,245,976; U.S. Pat. No. 3,668,450; U.S. Pat. No. 3,779,944; Belgian Pat. No. 551,851; Belgian Pat. No. 602,496; British Pat. No. 1,138,840; and U.S. patent application, Ser. No. 392,966, filed Aug. 30, 1973, which is herein incorporated by reference.

SUMMARY OF THE INVENTION

In distinction to the products and processes of the prior art we have now found that copolymers of 1,3-butadiene and 1,3-pentadiene (piperylene) having a random distribution of monomers enchained in a stereoregulated configuration and characterized by (1) a vinyl unsaturation ($-CH=CH_2$) pendant to the main polymer chain which is equal to or less than 10 percent of the total unsaturation present in the polymer; (2) enchainment of at least 95 percent of the piperylene monomer units in a 1,2-trans and 1,4-trans-stereoisomeric configuration and (3) selective enchainment of between about 50 and 95 percent of the butadiene monomer units in the 1,4-trans-stereoisomeric configuration; may be prepared with the aid of an iodine-containing catalyst system comprising $TiX_n$-$xMI_n$-$yI_2$-$zAlR_3$-$QLB$ wherein X is a halogen independently selected from the group consisting of chlorine, bromine and iodine; M is a metal from Groups IIIa and IVa of the Periodic Table of the Elements; R is a monovalent hydrocarbon radical selected from the group consisting of $C_1$ to $C_{12}$ alkyl, aryl, alkylaryl, arylalkyl and cycloalkyl radicals; LB is a Lewis Base; n is a number between 2 and 4; x has a numerical value of from 0 to 20; y is a number of from 0 to 5; z has a numerical value of from 1 to 40; and Q has a numerical value of from 5 to 500.

Within the preferred range of about 20 to 60 weight percent of piperylene, having a trans-isomer content of about 75 percent, or an equivalent amount, based on trans-isomer content, of piperylene having a trans-isomer content between about 50 to 100 percent, e.g., about 15 to 50 percent of a 100 percent trans-piperylene in the mixed monomer feed to a polymerization reactor for the production of the copolymers of this invention, the copolymers possess processing and mechanical properties comparable to those of natural rubber and when vulcanized exhibit high resistance to abrasion when compared to similarly compounded and vulcanized SBR rubber or blends of cis-polybutadiene and SBR rubbers.

DESCRIPTION OF PREFERRED EMBODIMENTS

Monomers

Butadiene in a degree of purity in excess of 99 percent, available from commercial sources as "Polymerization Grade Butadiene," was used in all of the following experimental runs.

Commercial grades of piperylene vary in the content of the cis and trans stereoisomers and usually contain significant amounts of cyclopentene and trace amounts of isoprene and cyclopentadiene. All of the piperylene used in the following experimental runs was purified by the $Cu_2Cl_2$ method described in U.S. Pat. No. 3,441,377 and contained 73 percent of the trans-stereoisomer and 27 percent of the cis-stereoisomer. Only the trans-isomer of piperylene is copolymerized with butadiene under the process conditions and with the catalyst system of the instant invention and one may recover piperylene enriched in the cis-isomer from the solvent at the termination of the polymerization reaction. Pure trans-piperylene, free of the cis-isomer may advantageously be used if available. The pure trans-isomer may be obtained by intensive fractional distillation or by the sulfone method described by D. Craig: J.A.C.S. 65, 1010 (1943) and R. L. Frank et al: J.A.C.S. 69, 2313 (1947).

Solvents

Suitable media for dissolving the catalyst components and polymeric reaction products include the general group of acyclic and alicyclic petroleum hydrocarbons. Acyclic $C_8$ or lower straight or branched chain saturated hydrocarbons as well as $C_5$ to $C_9$ alicyclic hydrocarbons which are free of olefinic unsaturation are suitable, of which the $C_6$ to $C_9$ aromatic hydrocarbons are preferred.

Non-limiting examples of suitable solvents include: n-butane, isobutane, n-pentane, isopentane, hexane, heptane, isooctane, cyclopentane, methylcyclopentane, cyclohexane, methylcyclohexane, benzene, toluene and mixed xylenes.

All solvents should be free of any traces of moisture or impurities which react with or inactivate any of the catalyst components. Solvents used in the following experiments were of Reagent Grade purity but were further purified and dried before use by distillation and percolation through a column of Linde 4A molecular sieves.

Catalysts

Catalyst systems suitable for the production of the novel copolymers of this invention belong in general to the Ziegler group, must contain iodine (either free or combined) and comprise (a) a titanium halide; (b) from 0 to about 20 molar equivalents of a metal iodide from Groups IIIa or IVa of the Periodic Table of the Elements; (c) from 0 to 5 molar equivalents of elemental iodine; (d) from 1 to about 40 molar equivalents of an aluminum alkyl, aryl, arylalkyl, alkylaryl or cycloalkyl compound; and (e) from about 5 to about 500, preferably 10 to 500, most preferably 15 to 400, molar equivalents of a Lewis Base.

The composition of each component of the catalyst system may comprise:

a. Titanium trichloride, titanium tetrachloride, titanium tribromide, titanium tetrabromide, titanium diiodide, titanium triiodide and titanium tetraiodide. Preferred is titanium chloride on the basis of commercial availability.

b. Preferred metal iodides from Groups IIIa and IVa are aluminum triiodide ($AlI_3$) and tin tetraiodide ($SnI_4$). Most preferred is $AlI_3$. However, the metal iodide may be omitted from the catalyst composition when the titanium iodide is $TiI_4$.

c. From 1 to 5 molar equivalents of elemental iodine calculated on the amount of titanium halide employed may be substituted for the metal iodide when the latter is $TiCl_4$ or $TiBr_4$.

d. Non-limiting examples of suitable $AlR_3$ compounds include aluminum trimethyl, aluminum triethyl, aluminum triisobutyl, aluminum trihexyl, aluminum tricyclohexyl, aluminum tribenzyl and aluminum tridodecyl. Preferred are aluminum triethyl and aluminum triisobutyl.

e. Suitable Lewis Bases include thia and oxa heterocyclic compounds. Non-limiting examples include thiolanes such as tetrahydrothiophene, hereinafter abbreviated to THT; alkyl thiolanes such as 3-methyl tetrahydrothiophene; tetrahydrothiapyrans and alkyl derivatives thereof; tetrahydrofuran and alkyl substituted derivatives such as 2,5-dimethyl tetrahydrofuran. Tetrahydropyrans and alkyl substituted derivatives thereof. Most preferred is THT.

In preparing the catalyst, the $TiX_n.xMI_n$ portion may be prepared in advance of use by, for example fusion of the components or by grinding or ball milling or by co-crystallization of the individual components.

Non-limiting examples of suitable catalyst combinations include: $TiCl_3.3AlI_3$-$9AlEt_3$-175 THT; $TiCl_3$.$3AlI_3$-$6AlEt_3$-100 THT; $TiBr_4$-$3AlI_3$-$9AlEt_3$-70 THT; $TiCl_4$-$5AlI_3$-12 $AlEt_3$-80 THT; $TiBr_4$-$3AlI_3$-$9AlEt_3$-70 THT; $TiCl_3.3AlI_3$-12 $AlEt_3$-233 THT; $TiCl_3.5AlI_3$-$10AlEt_3$-160 THT; $TiCl_4$-$3SnI_4$-$12AlEt_3$-70 THT; $TiBr_4$-$3SnI_4$-$12AlEt_3$-50 THT; $TiCl_4$-$2I_2$-$7AlEt_3$-60 THT; $TiCl_3.5AlI_3$-$10AlEt_3$-80 THT; $TiCl_3.5AlI_3$-$12AlEt_3$-90 THT; $TiCl_4$-$2I_2$-$5AlEt_3$-70 THT; $TiI_4$-3.5 $AlEt_3$-35 THT; and $TiCl_3$ .$AlI_3$-$2AlEt_3$.

Process Conditions

The copolymers of this invention may be prepared in batch, semi-continuous or fully continuous processes using a homogeneous solution system. In a typical batch process, a reactor constructed of or lined with a material that is inert to the reactants and is capable of withstanding the operating pressure and is fitted with efficient agitation and heat exchange means, is purged of air by displacement with oxygen-free nitrogen, argon or low-boiling saturated hydrocarbon vapors such as methane, ethane, or propane and charged with dry solvent. In all process versions, the mixed monomers and catalyst components, prediluted with solvent if desired, may be introduced into the stirred reactor either simultaneously or sequentially, at a rate consistent with the means used for heat-exchange to maintain the desired temperature range. The preferred mode of addition used for the experimental runs reported below was: solvent, $TiX_n.xMI_n$ dissolved in solvent, mixed monomers, and $AlR_3$-THT dissolved in solvent. The various components may be mixed in line or added directly to the reactor.

Reaction time may vary between 15 minutes to over 100 hours depending on the concentration of the monomers and catalysts in the solvent and the temperature at which the reaction is maintained.

Temperature may vary between 10°C. to 100°C; preferred are temperatures in the range of 20°C. to 80°C.; most preferred are temperatures in the range of 25°C. to 60°C.

Pressure is not critical but should be sufficient to maintain the reaction mixture in the liquid phase.

Concentration of the $TiX_n$ may be held within the range of 0.05 millimoles to 5.0 millimoles per liter. The concentrations of the other components in any catalyst system will depend on the values assigned to $x$, $y$, $z$ and Q in the general formula $TiX_n$-$xMI_n$-$yI_2$-$zAlR_3$-QLB.

In homogeneous solution processes such as are used for the production of the high molecular weight copolymers of this invention, the concentration of the polymer in the cement, is usually limited to a range of 5 to 20 weight percent, since higher concentrations require excessive power input to insure good mixing and make efficient heat exchange difficult. Additionally, the high viscosity of more concentrated polymer solutions at the temperatures which are employed may cause sticking and fouling of the reactor, especially at the surfaces involved in heat exchange.

Isolation of the copolymer at the completion of the polymerization reaction may be accomplished in a variety of ways. In a preferred embodiment, the homogeneous polymer cement is fed from the reactor in the case of a batch process, or final reactor or holding drum or time-tank in the case of a semi-continuous or fully continuous process, to a mixing drum where the reaction mixture is treated with a quantity of a lower alcohol such as methanol, ethanol or isopropanol, which may be added either in the cement transfer line or directly to the finishing drum in order to inactivate the catalyst mixture. The alcohol may optionally contain an alkali metal alkoxide or a sequestering reagent such as ethylene diamine tetra-acetic acid or its disodium salt or acetylacetone. While inactivation of the catalyst in the manner indicated is preferred, other methods of converting it into the inactive and innocuous residues may also be employed, or inactivation may even be omitted, especially when subsequent extensive removal of the catalyst residues is also contemplated.

The polymer solution, with or without catalyst inactivation as described above, is fed to an agitated wash drum where it is mixed with water or a dilute aqueous solution of an acid such as hydrochloric or sulfuric acid in order to solubilize the mineral constituents of the catalyst system and effect deashing of the polymer. Acid treatment, or alternative deashing procedures using water soluble sequestering agents, followed by water washing under efficient agitation is repeated if necessary so as to obtain a polymer with a minimal ash content.

Final isolation of the polymer in crumb form is accomplished by feeding the deashed polymer solution to a slurry flash drum where it is treated with steam and hot water to precipitate the polymer and vaporize the solvent. Typically, antioxidants, stabilizers and slurry aids are added to the polymer solution before slurrying and solvent removal. The water slurry is finally fed to dewatering and drying extruders before packaging in bale or crumb form. Solvent and unreacted monomers if present are collected at the appropriate steps in the finishing procedure, purified and recycled to the polymerization reactors.

Laboratory Scale Polymerizations

Polymerizations, detailed in the examples below were carried out in two types of reaction vessels. In the one, aluminum-jacketed pressure bottles having a capacity of about 1 liter and provided with closures having a safety blowout patch were oven dried at 100°C. and transferred while hot to a dry box where they were maintained until cool under a positive pressure of oxygen-free nitrogen.

The bottles were then charged with 500 ml. of purified solvent and the $TiX_n$-$xMI_n$ portion of the catalyst, prepared by either fusion, cocrystallization or intimate mixing essentially as described in U.S. Pat. No. 3,471,461, which on swirling of the bottle readily dissolved in the diluent. There was then added 100 g of the mixture of monomers followed by a mixture of the aluminum alkyl and Lewis Base (if employed) dissolved in solvent. After the bottles were sealed they were transferred from the dry box to a paddle wheel stirrer submerged in a constant temperature water bath and tumbled for a period of time.

The polymerizations were terminated by the addition of 10 ml of a 0.2 molar solution of sodium isopropoxide in absolute isopropanol to each bottle and then pouring the contents of each bottle, with stirring, into 1 liter of 99 percent isopropanol in which was dissolved 0.5 g. of N-phenyl-$\beta$-naphthylamine, hereinafter abbreviated to PBN. The mixture was allowed to stand for about 20 hrs. at room temperature in the alcohol with occasional kneading, the mixed solvents decanted from the polymer and the polymer resuspended in 0.5 liter of isopropanol having dissolved therein PBN at a concentration of 0.5 g per liter. The polymer was allowed to stand in contact with the alcohol, with occasional kneading, for two hours in order to insure complete extraction of the catalyst residues and low molecular weight polymers, dimers and trimers. The alcohol was then decanted from the polymer, the polymer resuspended in an equal weight of anhydrous isopropanol containing 1.0 g. of PBN per liter and chopped in a Waring Blender. After standing for some hours in the alcohol the polymer was filtered from the alcohol and dried under a vacuum of 100 torr at 50°C.

In a second series of experimental runs, one-half gallon glass jars fitted with plastic screw cap closures which were lined with aluminum foil were used in place of the pressure bottles. Order of addition of solvent, catalyst, monomers and alkylaluminum-Lewis Base was the same as in the pressure bottle experiments and agitation of the reaction mixture was by means of magnetic stirring bars enclosed in TEFLON.

The copolymers of this invention are essentially amorphous and exhibit little, if any, crystallinity in a relaxed state but may exhibit considerable crystallinity when stretched. Molecular weight of the copolymers varies between about 100,000 and 1,000,000 and appears to be inversely proportional to the amount of catalyst employed for the same charge of monomers in the reaction mixture and the same degree of conversion. Molecular weights reported herein are Viscosity Average Molecular Weights ($\overline{M}_v$) which have been calculated from the inherent viscosity of the copolymers in toluene at 25°C. according to the relationship reported by Johnson and Wolfangel in Ind. Eng. Chem. 44, 752 (1952).

The relative distribution of the different types of unsaturation in the copolymers was calculated from the Infrared (I.R.) absorption peaks at $910^{cm-1}$ for pendant vinyl unsaturation; $963^{cm-1}$ for trans-unsaturation and $740^{cm-1}$ for cis-unsaturation on a 1 g. per 100 ml. solution of the polymer in carbon bisulfide with 1 mm cells equipped with KBr windows used for both the sample and the pure carbon disulfide used as the reference.

The relative amounts of 1,2 and 1,4 trans-addition of the piperylene was determined from NMR spectra, using the relative abundance of protons on the methyl groups situated alpha (in the case of 1,2-enchainment) and beta (in the case of 1,4-enchainment) to unsaturated carbon atoms. Intervals which were electronically integrated were 1.75 to 1.40 ppm for the 1,2-mode of addition and 1.10 to 0.60 ppm for the 1,4-mode of addition.

The invention and the advance that it represents over the prior art is further illustrated by the following examples.

PREPARATION OF COPOLYMERS

EXAMPLE 1 (Catalyst: $TiCl_3.5AlI_3$-$12AlEt_3$-90 THT)

Eight one-half gallon jars fitted with Teflon-enclosed magnetic stirring bars, as above described, were dried in an oven at 100°C; transferred while hot to a drybox having an atmosphere of oxygen-free nitrogen and when cooled to room temperature, each jar was charged in the following order with 500 ml. of dry, purified benzene; 0.219 grams of a mixture of 1.0 mole of $TiCl_3$ and 5.0 moles of $AlI_3$ made by fusion of the mixture twice for 20 hours at 300°C. with intermediate homogenization, followed by ballmilling for 15 hours; 100 grams of a mixture of monomers consisting of 66.7 grams of "Polymerization Grade" butadiene and 33.3 grams of piperylene purified by selective absorption on $Cu_2Cl_2$ as described in U.S. Pat. No. 3,441,377 and consisting of 73 percent of the trans-isomer and 27 percent of the cis-isomer; followed finally by a solution of 0.137 grams of triethylaluminum ($AlEt_3$) and 0.794 grams of tetrahydrothiophene (THT) in about 5 ml. of purified benzene. Before use, the THT was dried by storing it for several days over Linde 4A molecular sieves and then distilled, an 80 percent heart cut being collected and used.

The bottles were capped and sealed in the dry box and gently agitated at room temperature by means of magnetic stirrers for 20 hours at the end of which time the polymerizations were terminated by the addition of sodium isopropoxide in anhydrous isopropanol and the polymer deashed and isolated as a fine crumb as described above. The combined polymer from the eight runs weighed 560 grams and had a $\overline{M}_v$ of 165,000.

Examination of a sample of the polymer dissolved in $CS_2$ by infrared according to the method previously described showed the unsaturation in the polymer to be distributed as follows: vinyl, 4.8 percent; cis, 10 percent; and trans, 85.2 percent. NMR examination of the polymer indicated the piperylene to be enchained as the 1,2-trans-stereoisomer to the extent of 35 percent and the 1,4-trans-stereoisomer to the extent of 65 percent. No enchainment of the piperylene as the cis-isomer could be detected within the limits of accuracy of the method.

EXAMPLE 2 (Catalyst: $TiCl_3 \cdot 5AlI_3 \cdot 10AlEt_3 \cdot 80$ THT)

Six one-half gallon jars, equipped as in Example 1 were each charged in order with 500 ml. of benzene; 0.219 grams of a $TiCl_3 \cdot 5AlI_3$ fused and ballmilled catalyst mixture prepared as in Example 1; 100 grams of a mixture of monomers consisting of 50.0 g. of 1,3-butadiene and 50.0 g. of piperylene having a trans-isomer content of 73 percent; and 0.114 g. of $AlEt_3$ and 0.705 g. of THT dissolved in about 5 ml. of purified benzene. The bottles were capped and sealed and magnetically stirred at room temperature for 19 hours at the end of which time the polymerizations were terminated as described in Example 1. The contents of the bottles were then combined, thoroughly mixed and added to two volumes of rapidly stirred isopropanol. The filtered and dried combined polymer from the six runs weighed 432 grams, had a $\overline{M}_v$ of 280,000 and, as revealed by I.R. examination, a vinyl unsaturation of 1.7 percent; a cis-unsaturation of 10.9 percent; and a trans-unsaturation of 87.4 percent.

EXAMPLE 3 (Catalyst: $TiCl_3 \cdot 5AlI_3 \cdot 10AlEt_3 \cdot 80$ THT)

Example 2 was repeated except that each 100 g. of mixed monomers added to each jar consisted of 60 g. of butadiene and 40 g. of 73 percent trans-piperylene, and the reaction period was 43 hours. Quantities of solvent, catalyst, order of addition and the method of isolation of the polymer were the same as used in the preparation of the polymer in Example 2. The combined dried polymer from the six runs weighed 441 g. and had a $\overline{M}_v$ of 305,000. Polymer unsaturation was distributed between vinyl, 1.8 percent; cis, 12.9 percent; and trans, 85.3 percent.

EXAMPLE 4 (Catalyst: $TiCl_3 \cdot 5AlI_3 \cdot 10AlEt_3 \cdot 80$ THT)

Example 2 was repeated, except that each 100 g. of mixed monomers added to each jar consisted of 66.7 g. of butadiene and 33.3 g. of 73 percent trans-piperylene, and a reaction time of 44 hours was used. The combined dried polymer from the six runs weighed 451 g. and had a $\overline{M}_v$ of 305,000. Polymer unsaturation was distributed between vinyl, 2.3 percent; cis, 12.0 percent; and trans, 85.7 percent.

EXAMPLE 5 (Catalyst: $TiCl_3 \cdot 5AlI_3 \cdot 10AlEt_3 \cdot 80$ THT)

Example 2 was repeated, except that each 100 g. of mixed monomers added to each jar consisted of 70 g. of butadiene and 30 g. of 73 percent trans-piperylene. The reaction time was 20 hours. The combined dried polymer from the six runs weighed 449 g. and had a $\overline{M}_v$ of 380,000. Polymer unsaturation was distributed between vinyl, 2.3 percent; cis, 12.0 percent; and trans, 85.7 percent.

EXAMPLE 6 (Catalyst: $TiCl_3 \cdot 5AlI_3 \cdot 10AlEt_3 \cdot 80$ THT)

Example 2 was repeated, except that each 100 g. of mixed monomers added to each jar consisted of 72.5 g. of butadiene and 27.5 g. of piperylene having a trans content of 73 percent. Reaction time was 18 hours. The combined polymer weighed 431 g. and had a $\overline{M}_v$ of 445,000. Polymer unsaturation was distributed between vinyl, 2.5 percent; cis, 12.2 percent; and trans, 85.4 percent.

EXAMPLE 7 (Catalyst: $TiCl_3 \cdot 5AlI_3 \cdot 10AlEt_3 \cdot 80$ THT)

Example 2 was repeated, except that each 100 g. of mixed monomers added to each jar consisted of 75 g. of butadiene and 25 g. of piperylene having a trans content of 73 percent. Reaction time was 19 hours. The combined polymer weighed 445 g. and had a $\overline{M}_v$ of 325,000 which appears to be low. Unsaturation was distributed between vinyl, 2.6 percent; cis, 12.5 percent and trans, 84.9 percent.

EXAMPLE 8 (Catalyst: $TiCl_4 \cdot 5AlI_3 \cdot 12AlEt_3 \cdot 80$ THT)

A one-half gallon jar equipped as in Example 1 was charged in order with 500 ml. of purified benzene; 0.019 g. of titanium tetrachloride ($TiCl_4$); 0.204 g. of aluminum iodide ($AlI_3$); 100 g. of mixed monomers consisting of 50 g. of butadiene and 50 g. of piperylene having a trans-isomer content of 73 percent; and a mixture of 0.137 g. of $AlEt_3$ and 0.705 g. of THT dissolved in about 5 ml. of purified benzene. The jar was capped, sealed and magnetically stirred for a total of 21 hours at the end of which time the polymerization was terminated and the polymer isolated by pouring the benzene solution into 1 liter of rapidly stirred isopropanol. The filtered and dried polymer weighed 71.0 g., had a $\overline{M}_v$ of 235,000 and an unsaturation distributed as vinyl, 2.0 percent; cis 11.4 percent; and trans 86.6 percent. Evaporation of the combined benzene-isopropanol filtrate yielded an oily residue of 14.3 g. which comprised catalyst residues, oligomers and low molecular weight polymers.

EXAMPLE 9 (Catalyst: $TiBr_4 \cdot 3AlI_3 \cdot 9AlEt_3 \cdot 70$ THT)

A copolymer of butadiene and piperylene was synthesized from the mixed monomers using the above catalyst system in essentially the same manner as was used for the preparation of Example 8. A one-half gallon jar was charged in order with the following: 500 ml. of purified benzene; 0.0368 g. of TiBr$_4$; 0.122 g. of AlI$_3$; 100 g. of mixed monomers consisting of 66.7 g. of butadiene and 33.3 g. of piperylene having a trans-isomer content of 73 percent; and a mixture of 0.103 g. of AlEt$_3$ and 0.617 g. of THT dissolved in about 5 ml. of benzene. The jar was capped and sealed and magnetically stirred at room temperature for 67 hours. The polymeric product was isolated in the same manner as the product of Example 8 and when dried weighed 77.4 g., had a $\overline{M}_v$ of 235,000 and when analyzed by I.R. had an unsaturation distributed as vinyl, 3.9 percent; cis, 11.7 percent, and trans, 84.4 percent. Evaporation of the combined filtrate yielded an oily residue of 8.7 g.

EXAMPLE 10 (Catalyst: TiCl$_4$-3SnI$_4$-12AlEt$_3$-70 THT)

Essentially the same equipment and procedure was used for the synthesis of the following copolymer, using the above catalyst system, as was used in Example 8. A one-half gallon jar was charged in order with 500 ml. of purified benzene; 0.019 g. of TiCl$_4$; 0.188 g. of SnI$_4$; 100 g. of mixed monomers consisting of 50 g. of butadiene and 50 g. of piperylene having a trans-isomer content of 73 percent; and a mixture of 0.137 g. of AlEt$_3$ and 0.617 g. of THT dissolved in about 5 ml. of benzene. The jar was capped, sealed and magnetically stirred for 216 hours. Catalyst inactivation isolation of the polymer was the same as was used in Example 8. The dried polymer weighed 41.1 g., had a $\overline{M}_v$ of 260,000 and an unsaturation distributed as vinyl, 1.8 percent; cis, 8.9 percent; and trans, 89.3 percent.

EXAMPLE 11 (Catalyst: TiBr$_4$-3SnI$_4$-12AlEt$_3$-50 THT)

The above catalyst system was used to prepare a copolymer of butadiene and piperylene using the same equipment and procedure as was used to prepare the polymer of Example 8. To the one-half gallon jar there was added in the following order: 500 ml. of purified benzene; 0.037 g. of TiBr$_4$; 0.1879 g. of SnI$_4$; 100 g. of mixed monomers consisting of 66.7 g. of butadiene and 33.3 g. of piperylene having a trans-isomer content of 73 percent; and a mixture of 0.137 g. of AlEt$_3$ and 0.441 g. of THT dissolved in about 5 ml. of benzene. Reaction time at room temperature was 67 hours and isolation of the polymer was as in Example 8. The dried polymer weighed 80.9 g., had a M$_v$ of 305,000 and an unsaturation distributed as vinyl, 2.2 percent; cis, 18.7 percent and trans, 79.1 percent.

EXAMPLE 12 (Catalyst: TiI$_4$-3.5AlEt$_3$-35 THT)

Four one-half gallon jars equipped as in Example 1 were each charged with 500 ml. of purified benzene; 0.111 g. of TiI$_4$; 100 g. of mixed monomers consisting of 75 g. of butadiene and 25 g. of piperylene having a trans-isomer content of 73 percent; and a mixture of 0.0799 g. of AlEt$_3$ and 0.6167 g. of THT dissolved in about 5 ml. of benzene. The jars were capped, sealed and magnetically stirred at room temperature for 66 hours at the end of which time the polymer was recovered as in Example 1. The dried polymer, combined from the four runs weighed 276 g., had a $\overline{M}_v$ of 350,000 and an unsaturation distributed as vinyl, 3.1 percent; cis, 12.8 percent; and trans, 84.1 percent.

EXAMPLE 13 (Catalyst: TiCl$_4$-2I$_2$-5AlEt$_3$-70 THT)

A one-half gallon jar equipped with a magnetic stirring bar was charged in the following order with 500 ml. of purified benzene; 0.019 g. of TiCl$_4$; 100 g. of mixed monomers consisting of 66.7 g. of butadiene and 33.3 g. of piperylene having a trans-isomer content of 73 percent; a mixture of 0.051 g. of reagent grade iodine and 0.057 g. of AlEt$_3$ dissolved in about 5 ml of benzene; and 0.617 g. of THT. The jar was capped, sealed and the contents stirred magnetically at room temperature for 143 hours, and the polymer recovered by pouring the reaction mixture in a slow stream into 1 liter of rapidly stirred isopropanol. The filtered and dried polymer weighed 40.0 g., had a $\overline{M}_v$ of 155,000 and an unsaturation distributed as vinyl, 6.5 percent; cis, 12.2 percent; and trans, 81.3 percent.

EXAMPLE 14 (Catalyst: TiI$_2$.3AlI$_3$-5AlEt$_3$-80 THT)

A butadiene-piperylene copolymerization was carried out in a one-half gallon jar essentially according to the procedure described for the individual experiments in Example 2, but with a catalyst consisting of: TiI$_2$.3AlI$_3$ (prepared according to the equation 3TiI$_4$ + 2Al + 7AlI$_3$ → 3 (TiI$_2$.3AlI$_3$) by heating the starting materials in a sealed tube for 2 × 24 hrs. at 300°C. and then steel ballmilling the final product for 16 hrs.) - 0.149 g; AlEt$_3$-0.057 g; and THT-0.705 g. The monomer mixture employed contained 66.7 g. 1,3-butadiene and 33.3 g. piperylene having a trans-isomer content of 73 percent. After a reaction time of 20 hrs., 66.4 g. of a rubbery polymer having an $\overline{M}_v$ of 260,000 were recovered.

EXAMPLE 15 (Catalyst: TiCl$_3$.3AlI$_3$-6AlEt$_3$-100 THT)

A copolymerization experiment involving four one-half gallon jars was carried out essentially as described in Example 12, but with a catalyst consisting of (for each jar): TiCl$_3$.3AlI$_3$ (made by fusing the components in a sealed tube for 2 × 20 hrs. at 300°C. with homogenization in a mortar between the reaction periods and steel ballmilling for 15.5 hours after the final heating period) - 0.096 g; AlEt$_3$-0.048 g; and THT-0.617 g. The monomer mixture employed for each bottle contained 66.7 g. 1,3-butadiene and 33.3 g. piperylene having a trans-isomer content of 73 percent. The polymerizations were terminated after 19 hrs. and the combined polymers from the four bottles recovered as described in Example 2. The total polymer weight was 288 g. The $\overline{M}_v$ of the recovered polymer was 415,000 and the unsaturation distributed as follows: vinyl-2.8 percent; cis - 12.0 percent; and trans-85.2 percent.

EXAMPLE 16 (Catalyst: TiCl$_3$.AlI$_3$-2AlEt$_3$; No Lewis Base)

A 1 liter pressure bottle was charged with 500 ml of purified benzene, 0.070 g. of TiCl$_3$.AlI$_3$, previously prepared by fusion of equimolar quantities of the components for 24 hours at 300°C., followed by ballmilling with steel balls for 15 hours, 75 g. of butadiene and 25 g. of piperylene having a trans-isomer content of 73 percent and 0.0285 g. of AlEt$_3$ dissolved in 1 ml. of benzene. The bottle was capped, attached to a paddle wheel mixer submerged in a water bath maintained at 25°C. and the bottle contents mixed for 48 hours. The polymerization was terminated by the addition of sodium isopropoxide in isopropanol and the polymer precipitated by addition of the benzene solution to 1 liter of rapidly stirred isopropanol. The dried polymer weighed 86.3 g., had a $\overline{M}_r$ of 330,000 and showed on I.R. examination a distribution of unsaturation of vinyl, 3.5 percent; cis, 85.9 percent; and trans, 10.6 percent. As can be seen, in the absence of Lewis base, a mostly trans product was not obtained.

The above examples encompass a range of from about 1.66 to 3.33 moles of butadiene to 1 mole of piperylene, based on a trans-isomer content of the piperylene of 100 percent, and illustrate the wide range of monomer ratios and individual catalyst components that may be used to prepare the copolymers of this invention. The utility of these elastomeric compositions, particularly in areas requiring resistance to abrasion, such as in compositions useful as tire treads is further illustrated in the vulcanization examples detailed below.

Vulcanization Examples

EXAMPLE 17

Preliminary physical and dynamic tests on vulcanized polymers of this invention revealed that they possessed a marked resistance to abrasion. Accordingly, larger batches of the copolymers were prepared, as detailed in the examples above for use in comparative tests with two commercially available rubber systems particularly recommended for tiretread applications.

The formulation which was used in these tests is shown in Table I.

The first of the commercially available rubber systems was Ameripol 1808, a masterbatch of a cold styrenebutadiene rubber (SBR) containing 23.5 percent styrene, 75 parts per 100 parts of rubber (phr) of a high abrasion furnace (HAF) carbon black and 50 phr of a high aromatic process oil. Ameripol 1808 is supplied by Goodrich-Gulf Chemicals. The second system of commercially available rubber was made up from Ameripol 1808, Cis-4 rubber (a high cis-polybutadiene rubber supplied by Phillips Petroleum Co.), and additional carbon black and process oil in such proportions that the ratio of SBR/cis-polybutadiene, was 70/30 and the over-all composition corresponded to the formulation given in Table I.

TABLE I

| Tire Tread Formulation | Parts |
|---|---|
| Polymer or Polymer Blend | 100.0 |
| HAF Carbon Black (Phil Black N330) | 75.0 |
| Plasticizing Oil | 50.0 |
| Stearic Acid | 2.0 |
| Phenyl β-naphthylamine (PBN) | 0.5 |
| Zinc Oxide | 3.0 |
| Sulfur | 2.0 |
| N-cyclohexyl-2-benzothiazole sulfenamide (SANTOCURE) | 1.1 |
| Tetramethyl thiuram disulfide (TUADS) | 0.3 |

The Ameripol 1808 was freshened by milling on a two roll mill at 150°F. prior to the addition of the curing agents. The blending of the Ameripol 1808 and the Cis-4 rubber with the carbon black, oil, stearic acid and PBN was carried out in a Midget Banbury Mixer using 260 ml. of compound. The copolymer of this invention prepared in Example 1 was similarly blended in the Midget Banbury with oil, carbon black, stearic acid and PBN over a period of 5 minutes. The remainder of the ingredients shown in Table I were added to each of the Banbury mixtures referred to above on an open (two roll) mill at 150°F., and the resulting tread compounds cured at 293°F. Test data for the three samples at various cure times are given in Table II.

TABLE II

| PROPERTIES OF TREND COMPOUNDS | | | |
|---|---|---|---|
| Polymer[1] | A | B | C |
| Mooney, 4' at 212°F. | 52.0 | 45.5 | 50 |
| Mooney Scorch at 280°F.: | | | |
| Minutes to 5 point rise | 15.2 | 15.0 | 6.5 |
| Minutes to 35 point rise | 17.3 | 16.7 | 7.6 |
| Cured 10 min. at 293°F.: | | | |
| Modulus at 300%, psi. | — | 60 | 1040 |
| Tensile strength, psi. | 50 | 290 | 2535 |
| % Elongation | 1100 | 1100 | 530 |
| Cured 20 min. at 293°F.: | | | |
| Modulus at 300%, psi. | 1070 | 1245 | 1100 |
| Tensile Strength, psi. | 2780 | 2160 | 2645 |
| % Elongation | 630 | 475 | 535 |

[1]A is Ameripol 1808
B is blend of Ameripol 1808 and Cis-4
C is copolymer of Example 1

The test data in Table II suggest that the cure system used, while recommended for the Ameripol 1808 and the blend of Ameripol 1808 and Cis-4, is probably too fast for the copolymers of this invention. This is indicated by the Mooney scorch time of less than 7 minutes and a cure to a maximum state in only 10 minutes at 293°F.

Sample wheels of the three rubber compounds shown in Table II were cured for 1 hour at 293°F. and tested for abrasion resistance by means of the Lambourne Abrader procedure described by R. L. Zapp in Rubber World, 133, 1 (1955) and in Rubber Chem. & Tech. 29, 33 (1956). The Lambourne abrasion results at 70 miles per hour and Stop and Go procedures are given in Table III, along with tensile data for vulcanizates similarly cured with respect to time and temperature.

TABLE III

| Polymer | A | B | C |
|---|---|---|---|
| Modulus at 300%, psi | 1350 | 1350 | 1130 |
| Tensile strength, psi | 2880 | 2235 | 2510 |
| Elongation, % | 540 | 435 | 505 |
| Wear Rate cc per km (Lambourne) | | | |
| at 70 MPH | 0.097 | 0.126 | 0.055 |
| At Stop and Go | 0.157 | 0.170 | 0.060 |

The data in Table III show that the copolymers produce vulcanizates that exhibit from one-third to one-half the wear, when tested by the Lambourne Abrader, that is found for comparable vulcanizates of SBR and blends of SBR and Cis-4. Almost twenty years experience with the Lambourne Abrader has shown that the results obtained with this test correlate well with actual road tests on tires made with the same rubber.

EXAMPLE 18

The four copolymers of butadiene and piperylene prepared in Examples 2 to 5, respectively, were each compounded according to the formulation given in Table IV and vulcanized for 45 minutes at 287°F. The test results obtained are given in Table V.

TABLE IV

| Copolymers of Examples 2-5 | 100 |
|---|---|
| Super Abrasion Furnace (SAF) Black | 50 |
| Flexon 580 Oil[1] | Note[2] |
| Stearic Acid | 3 |
| Zinc Oxide | 5 |
| Sulfur | 2 |

TABLE IV-continued

| SANTOCURE | 2 |
|---|---|

[1] A naphthenic base, ASTM-Type 3 petroleum oil having an aromatic content of about 50%; Aniline Pt. 177°F; and viscosity of 84 SUS at 210°F.
[2] Samples 2 and 3 had 20 parts of added oil; Samples 4 and 5 had 30 parts of added oil.

TABLE V

| Copolymer of Example | 2 | 3 | 4 | 5 |
|---|---|---|---|---|
| Oil Extension, % | 20 | 20 | 30 | 30 |
| 100% Modulus, psi | 225 | 270 | 215 | 200 |
| 300% Modulus, psi | 1200 | 1650 | 1185 | 1290 |
| Tensile Strength, psi | 3325 | 3900 | 3400 | 3465 |
| Elongation, % | 515 | 485 | 535 | 495 |
| Mooney Scorch, MS-5, 260°F., min. | 20 | 19 | 21 | 21 |

EXAMPLE 19

Seven new compounds (formulated as indicated in Table VI) consisting of 100% SBR; a blend of 70% of SBR and 30% of Cis-4, a blend of 50% SBR and 50% of Cis-4 and the four butadiene-piperylene copolymers of Examples 2 to 5 were prepared and tested for wear rate in a manner similar to that described in Example 17.

TABLE VI

| | Parts |
|---|---|
| Polymer | 100 |
| HAF Black | 75 |
| Flexon 580 Oil | 50 |
| Stearic Acid | 2 |
| N-Phenyl-β-Naphthylamine | 0.5 |
| Zinc Oxide | 3 |
| Sulfur | 2 |
| SANTOCURE | 1 |
| TUADS[1] | 0.27 |
| Diphenyl Guanidine (DPG)[2] | 0.20 |

[1] Used only in SBR and SBR-Cis-4 compounds
[2] Used only with Examples 2-5 copolymers The rubber, carbon black and oil were masterbatched for each compound, in the Midget Banbury and the remaining ingredients added on the mill as in Example 17. Stress-strain properties were determined on test specimens cured for 20, 35 and 60 minutes at 293°F. and Lambourne Abrader measurements were made on specimens cured for 35 minutes at 293°F. Lambourne Wear data are given in Table VII and stress-strain results in Table VIII.

TABLE VII

| | | Wear Rate Cc/Km | |
|---|---|---|---|
| | Sample No.[2] | 70 MPH | S & G[1] |
| 1. | 100% SBR | 0.141 | 0.193 |
| 2. | 70/30% SBR/Cis-4 | 0.138 | 0.175 |
| 3. | 50/50% SBR/Cis-4 | 0.130 | 0.164 |
| 4. | Polymer of Example 2 | 0.138 | 0.180 |
| 5. | Polymer of Example 3 | 0.146 | 0.185 |
| 6. | Polymer of Example 4 | 0.130 | 0.147 |
| 7. | Polymer of Example 5 | 0.095 | 0.105 |

[1] Stop and Go procedure
[2] Sample Numbers in Table VIII refer to the same samples in Table VII

TABLE VIII

| SAMPLE NO. | 1 | 2 | 3 | 4 | 5 | 6 | 7 |
|---|---|---|---|---|---|---|---|
| Cured 20 Minutes at 293°F. | | | | | | | |
| Hardness, Shore A | 59 | 60 | 58 | 52 | 50 | 53 | 52 |
| 100% Modulus, psi | 230 | 250 | 260 | 150 | 150 | 165 | 160 |
| 300% Modulus, psi | 1250 | 1350 | 1380 | 840 | 860 | 965 | 965 |
| Tensile Strength, psi | 2700 | 2150 | 1800 | 2200 | 2150 | 2950 | 3000 |
| Elongation, % | 595 | 425 | 370 | 570 | 530 | 600 | 590 |
| Cured 35 Minutes at 293°F. | | | | | | | |
| Hardness, Shore A | 59 | 59 | 58 | 52 | 51 | 54 | 53 |
| 100% Modulus, psi | 205 | 200 | 215 | 155 | 150 | 150 | 150 |
| 300% Modulus, psi | 1190 | 1200 | 1300 | 1000 | 1025 | 1060 | 1020 |
| Tensile Strength, psi | 2740 | 2550 | 2280 | 2150 | 2650 | 3000 | 2950 |
| Elongation, % | 600 | 530 | 475 | 500 | 545 | 565 | 560 |
| Cured 60 Minutes at 293°F. | | | | | | | |
| Hardness, Shore A | 60 | 59 | 59 | 53 | 51 | 53 | 52 |
| 100% Modulus, psi | 200 | 195 | 205 | 155 | 145 | 170 | 155 |
| 300% Modulus, psi | 1200 | 1190 | 1260 | 1000 | 1030 | 1140 | 1000 |
| Tensile Strength, psi | 2650 | 2600 | 2350 | 1650 | 2750 | 2790 | 3000 |
| Elongation, % | 575 | 575 | 490 | 400 | 540 | 530 | 575 |

Comparison of the wear rate and vulcanizate properties of the copolymers of this invention (Sample No's. 4 to 7) with similar data obtained with 100% SBR and blends of SBR and Cis-4 (Sample No's. 1 to 3) show that wear and stress-strain properties improve with increasing butadiene content in the mixture of monomers that is polymerized.

Therefore, the copolymers of Examples 6 and 7 were compounded in accordance with the formulation shown in Table VI and compared with a similarly compounded SBR rubber. The results are given in Table IX.

TABLE IX

| Stress-Strain Properties Cured 35 min. at 293°C. | 100% SBR | Poly. of Examp. 6 | Poly. of Examp. 7 |
|---|---|---|---|
| Hardness, Shore A | 60 | 56 | 57 |
| 100% Modulus, psi | 310 | 260 | 250 |
| 300% Modulus, psi | 1310 | 1470 | 1250 |
| Tensile Strength, psi | 2780 | 3490 | 3260 |
| Elongation, % | 590 | 500 | 505 |
| Cured 60 min. at 293°F. | | | |
| Hardness, Shore A | 59 | 58 | 56 |
| 100% Modulus, psi | 300 | 250 | 240 |
| 300% Modulus, psi | 1400 | 1600 | 1470 |
| Tensile Strength, psi | 2580 | 3410 | 3150 |
| Elongation, % | 500 | 480 | 485 |
| Lambourne Abrader Data Wheels cured 35 min. at 293°F. | | | |
| 70 MPH, Cc per Km. | 0.140 | 0.07 | 0.02 |
| Stop & Go, Cc per Km. | 0.190 | 0.09 | 0.02 |
| Garvey Die Extrusions ASTM D 2230-73 | | | |
| Extrusion Rate, In. per Min. | 70 | 104 | 104 |

The above data show that copolymers of butadiene and piperylene exhibiting superior abrasion resistance can be readily prepared with the catalyst systems disclosed herein. It will be apparent further to those skilled in the art, that piperylene having a trans-isomer content in the range of about 50 percent up to 100 percent may be substituted in the mixed monomer feed in an amount equivalent to the trans-isomer content of the piperylene used in the above examples, without adversely affecting the intrinsic properties of the copolymers. While the copolymers of this invention are particularly adapted to use in the tire-tread compositions, they are, of course, useful as well in other general purpose or specialty rubber applications.

What is claimed is:

1. Process for the production of a copolymer of 1,3-butadiene and piperylene characterized by a random distribution of monomer units in the polymer chain; vinyl unsaturation pendant to the main polymer chain which is equal to or less than 10 percent of the total unsaturation present in the polymer; enchainment of at least 95 percent of the piperylene in a 1,2-trans and 1,4-trans-stereoisomeric configuration; and selective enchainment of between about 50 and 95 percent of the butadiene monomer units in the 1,4-trans-stereoisomeric configuration; which comprises reacting a mixture of butadiene and piperylene in a solvent, said piperylene having a trans-stereoisomer content in the range of 50 to 100 percent, in the presence of an iodinecontaining catalyst system comprising $TiX_n\text{-}xMI_n\text{-}yI_2\text{-}zAlR_3\text{-}QLB$ wherein X is a halogen independently selected from the group consisting of chlorine, bromine and iodine; M is a metal from Groups IIIa and IVa of the Periodic Table of the Elements; R is a monovalent hydrocarbon radical selected from the group consisting of $C_1$ to $C_{12}$ alkyl, aryl, alkyl-aryl, arylalkyl and cycloalkyl radicals; LB is a Lewis Base, said Lewis Base being a thia heterocyclic compound selected from the group consisting of thiolane, tetrahydrothiapyran and alkyl substituted derivatives thereof or an oxa heterocyclic compound selected from the group consisting of tetrahydrofurans, tetrahydropyrans and alkyl substituted derivatives thereof; $n$ is a number from 2 to 4; $x$ has a numerical value of from 0 to 20; $y$ has a numerical value of from 0 to 5; $z$ has a numerical value of from 1 to 40; and Q has a numerical value of from 5 to 500; and isolating the copolymer from the solvent and catalyst.

2. Process according to claim 1 wherein $TiX_n$ is $TiCl_3$.

3. Process according to claim 1 wherein $MI_n$ is $AlI_3$.

4. Process according to claim 1 wherein $TiX_n \cdot MI_n$ is prepared by fusion, grinding, mixing, or cocrystallization of the individual components.

5. Process according to claim 1 wherein said Lewis Base is thiolane.

6. Process according to claim 1 wherein said piperylene has a trans-stereoisomer content in the range of 50 to 100 percent.

* * * * *